US 12,292,417 B2

(12) United States Patent
Endo

(10) Patent No.: US 12,292,417 B2
(45) Date of Patent: May 6, 2025

(54) REPETITIVE MOMENT GENERATING DEVICE

(71) Applicant: Fukuoka University, Fukuoka (JP)

(72) Inventor: Masahiro Endo, Fukuoka (JP)

(73) Assignee: Fukuoka University, Fukuoka (JP)

( * ) Notice: Subject to any disclaimer, the term of this patent is extended or adjusted under 35 U.S.C. 154(b) by 396 days.

(21) Appl. No.: 18/088,471

(22) Filed: Dec. 23, 2022

(65) Prior Publication Data

US 2023/0129401 A1    Apr. 27, 2023

Related U.S. Application Data

(63) Continuation of application No. PCT/JP2021/024768, filed on Jun. 30, 2021.

(30) Foreign Application Priority Data

Jul. 2, 2020    (JP) ................. 2020-114995

(51) Int. Cl.
*G01N 3/32* (2006.01)
*B06B 1/12* (2006.01)
(Continued)

(52) U.S. Cl.
CPC ............... *G01N 3/32* (2013.01); *B06B 1/12* (2013.01); *B06B 1/161* (2013.01); *G01M 7/022* (2013.01);
(Continued)

(58) Field of Classification Search
CPC ... G01N 2203/0021; G01N 2203/0073; G01N 3/22; G01N 3/32; G01M 7/00; G01M 7/022; B06B 1/161; B06B 1/12
See application file for complete search history.

(56) References Cited

U.S. PATENT DOCUMENTS

| 5,458,002 A | 10/1995 | Askea et al. |
| 6,321,610 B1 * | 11/2001 | Sekiguchi ............. B28B 1/0873 74/61 |
| 12,158,451 B2 * | 12/2024 | Endo ....................... G01N 3/32 |

FOREIGN PATENT DOCUMENTS

| CN | 110631815 A | * 12/2019 | ............ G01M 13/00 |
| JP | S50-099784 A | 8/1975 | |

(Continued)

OTHER PUBLICATIONS

International Search Report issued in PCT/JP2021/024768 mailed on Sep. 7, 2021 with English Translation (5 pages).
(Continued)

*Primary Examiner* — Benjamin R Schmitt
(74) *Attorney, Agent, or Firm* — Nakanishi IP Associates, LLC

(57) ABSTRACT

A repetitive moment generating device includes: eccentric weight members provided at shaft bodies in a state where the eccentric weight members intersect the rotatably held shaft bodies and in a state where the eccentric weight members are slidable in a direction that intersects the shaft bodies; sliders that are attached to the shaft bodies in a state where the sliders are slidable in a direction of shaft centers of the shaft bodies and in a state where the shaft bodies are able to idle; link mechanisms that convert sliding motion of the sliders in the directions of the shaft centers into sliding motion in a direction that intersects the shaft bodies and transmit the sliding motion to the eccentric weight members; handle that are operation means for causing the sliders to slide in the directions of the shaft centers of the shaft bodies; and the like.

7 Claims, 2 Drawing Sheets

(51) Int. Cl.
    *B06B 1/16*          (2006.01)
    *G01M 7/02*        (2006.01)
    *G01N 3/22*         (2006.01)

(52) U.S. Cl.
    CPC ....... *G01N 3/22* (2013.01); *G01N 2203/0021* (2013.01); *G01N 2203/0073* (2013.01)

(56) References Cited

FOREIGN PATENT DOCUMENTS

| | | |
|---|---|---|
| JP | H11-156296 A | 6/1999 |
| JP | H11-511552 A | 10/1999 |
| JP | 2007-107955 A | 4/2007 |
| JP | 2011-064508 A | 3/2011 |
| JP | 2018-036191 A | 3/2018 |
| JP | 2020-056706 A | 4/2020 |
| WO | 1997/008535 A1 | 3/1997 |

OTHER PUBLICATIONS

International Preliminary Report on Patentability issued in PCT/JP2021/024768 dated on Dec. 13, 2022, with English Translation (7 pages).

\* cited by examiner

REPETITIVE MOMENT GENERATING DEVICE

TECHNICAL FIELD

The present invention relates to a repetitive moment generating device that can be used for a fatigue testing machine for testing a fatigue strength property by imparting a repetitive moment on a test piece, and particularly to a repetitive moment generating device that has a function of changing an amplitude of a repetitive moment to be imparted on a test piece.

BACKGROUND ART

In regard to a fatigue testing machine for testing a fatigue strength property of a material (test piece) by imparting a repetitive moment on the test piece, a resonance-type bending torsional fatigue testing machine that generates repetitive torsional moment at a principal shaft for transmitting the repetitive torsional moment to the test piece by causing an eccentric weight driven by an electric motor to rotate on a distal end side of a lever member that is connected, in an intersecting manner, to the principal shaft is known in the related art.

However, since the bending torsional fatigue testing machine cannot change and adjust the amplitude of the repetitive torsional moment imparted on the test piece during operation (during rotation of the eccentric weight), it is necessary to perform the changing and adjustment work by stopping the electric motor to stop the rotation of the eccentric weight every time it is necessary to change and adjust the amplitude. Therefore, there is a problem that the fatigue testing may be interrupted every time the changing and adjustment work is performed or a torsional moment with an amplitude, the magnitude of which is different from that of the testing amplitude, may be transitionally imparted on the test piece every time the operation is interrupted and restarted.

On the other hand, the related arts of the present invention include, for example, the "torsional fatigue testing machine" described in Patent Literature 1 and the "oscillation device for a variable oscillation table" described in Patent Literature 2.

The "torsional fatigue testing machine" described in Patent Literature 1 is a torsional fatigue testing machine including: a rotation-side holding body that rotatably holds one end portion of an object to be tested; a fixation-side holding body that holds the other end portion of the object to be tested such that the other end cannot rotate; torque impartation means for imparting a torsional torque on the object to be tested via the rotation-side holding body; and a torque detector that detects the torsional torque of the object to be tested in a state where the torque is imparted by the torque impartation means, the torsional fatigue testing machine being characterized in that the torque impartation means includes an electric servo motor that imparts the torsional torque on the object to be tested, a servo controller that controls an output of the electric servo motor, and input means for inputting a set torque to the servo controller.

The "oscillation device for a variable oscillation table" described in Patent Literature 2 is characterized in that a four-shaft configuration is formed by disposing a pair of oscillation driving shafts with equivalent eccentric weights that are driven by independent motors and are synchronized with each other in parallel in an axially supported manner in a predetermined oscillation table and disposing oscillation driven shafts with mutually equivalent eccentric weights, the phases of which can be changed with the equivalent eccentric weights, in parallel with each oscillation driving shaft in an axially supported manner, symmetric reverse transmission mechanisms are formed by stretching a timing belt hooked at a toothed pulley provided at each oscillation driven shaft end over a toothed pulley at each oscillation driving shaft end via toothed tension pulleys disposed at upper and lower ends of each swinging support arm with the center thereof pivotally attached, pivot shafts of the left and right facing swinging support arms are coupled to an interlocking link mechanism controlled by a single cylinder such that the pivot shafts symmetrically turn, and only the amplitude of the oscillation table in the up-down direction is made variable from the maximum to the minimum in accordance with the amount of feeding of a cylinder rod.

CITATION LIST

Patent Literature

Patent Literature 1
   Japanese Patent Laid-Open No. 2007-107955
Patent Literature 2
   Japanese Patent Laid-Open No. 11-156296

SUMMARY OF INVENTION

Technical Problem

As described above, the bending torsional fatigue testing machine in the related art cannot change and adjust the amplitude of the repetitive torsional moment imparted on a test piece during operation (during rotation of the eccentric weight).

Also, although the "torsional fatigue testing machine" described in Patent Literature 1 is based on a scheme in which a torsional torque is imparted on an object to be tested by an electric servo motor, and it is possible to change a setting value of the torsional torque to be imparted on the object to be tested by using a PC, it is difficult to control an eccentric weight member that rotates 50 to 100 times per second by the torsional torque changing technique described in Patent Literature 1.

On the other hand, although the "oscillation device for a variable oscillation table" described in Patent Literature 2 can change the amplitude during operation of the oscillation table, it is difficult to apply an amplitude changing mechanism described in Patent Literature 2 to the resonance-type bending torsional fatigue testing machine that generates a repetitive torsional moment at a principal shaft by rotating an eccentric weight driven by an electric motor. Also, the amplitude changing mechanism described in Patent Literature 2 has a complicated structure.

Thus, a problem to be solved by the present invention is to provide a repetitive moment generating device that can be used for a fatigue testing machine that imparts a repetitive moment on a test piece through rotation of an eccentric weight and can change an amplitude of the repetitive moment imparted on the test piece even during rotation of the eccentric weight.

Solution to Problem

A repetitive moment generating device according to the present invention is a repetitive moment generating device that is used for a fatigue testing machine for testing a fatigue strength property by imparting a repetitive moment on a test piece, the repetitive moment generating device including: a principal shaft that is rotatably held to transmit a repetitive moment to a test piece set in the fatigue testing machine; a pair of lever members that are attached to the principal shaft at positions that are separated from each other in a shaft center direction of the principal shaft in a state where each of the lever members is orthogonal to the principal shaft; shaft bodies that are rotatably held around shaft centers, each of which is parallel with the principal shaft, at positions that are symmetrical with the principal shaft interposed therebetween in a region where the lever members face each other; drive means for causing the shaft bodies to synchronously rotate; eccentric weight members that are attached to the shaft bodies in a state where the eccentric weight members intersect the shaft bodies and in a state where the eccentric weight members are slidable in a direction that intersects the shaft bodies; sliders that are attached to the shaft bodies in a state where the sliders are slidable in shaft center directions of the shaft bodies and in a state where the shaft bodies are able to idle; joining means for converting sliding motion of the sliders in the shaft center directions of the shaft bodies into sliding motion of the eccentric weight members in a direction that intersects the shaft bodies and transmitting the sliding motion to the eccentric weight members; and operation means for causing the sliders to slide in the shaft center directions of the shaft bodies.

In the repetitive moment generating device, the joining means can include link mechanisms that include first link members that are turnably and axially supported by the sliders on one end portion side and are turnably and axially supported by the eccentric weight members on the other end portion side, and second link members that are turnably and axially supported by the shaft bodies on one end portion side and are turnably and axially supported by the first link members on the other end portion side.

In the repetitive moment generating device, the joining means may include wires that couple the sliders to the eccentric weight members via pulleys that are turnably and axially supported by the shaft bodies.

In the repetitive moment generating device, the eccentric weight members can be provided with stoppers that limit a sliding distance of the eccentric weight members with respect to the shaft bodies to a predetermined range.

In the repetitive moment generating device, between the stoppers of the eccentric weight members on one side and the shaft bodies, elastic members that couple the stoppers to the shaft bodies can be disposed to hold a state where centers of gravity of the eccentric weight members are located at shaft centers of the shaft bodies.

In the repetitive moment generating device, the operation means can include a male screw member that is screwed into a female screw hole provided to open in the sliders in a state where the male screw member is parallel with the shaft bodies, a bearing member that turnably holds the male screw member in a state where movement of the male screw member in a longitudinal direction is constrained, and a turning mechanism that causes the male screw member to turn.

In the repetitive moment generating device, the turning mechanism can include a helical gear that is attached to the male screw member concentrically with the male screw member, a worm gear that is engaged with the helical gear, and a handle that causes the worm gear to turn.

Advantageous Effect of Invention

According to the present invention, it is possible to provide a repetitive moment generating device that can be used for a fatigue testing machine that imparts a repetitive moment on a test piece through rotation of an eccentric weight and that can change an amplitude of the repetitive moment to be imparted on the test piece even during rotation of the eccentric weight.

DESCRIPTION OF EMBODIMENTS

Hereinafter, repetitive moment generating devices 100, 200 according to embodiments of the present invention will be described on the basis of FIGS. 1 to 4. Note that FIGS. 1 to 4 are partially expressed with some of components illustrated as being transparent in order to enhance visibility.

Figure 1:
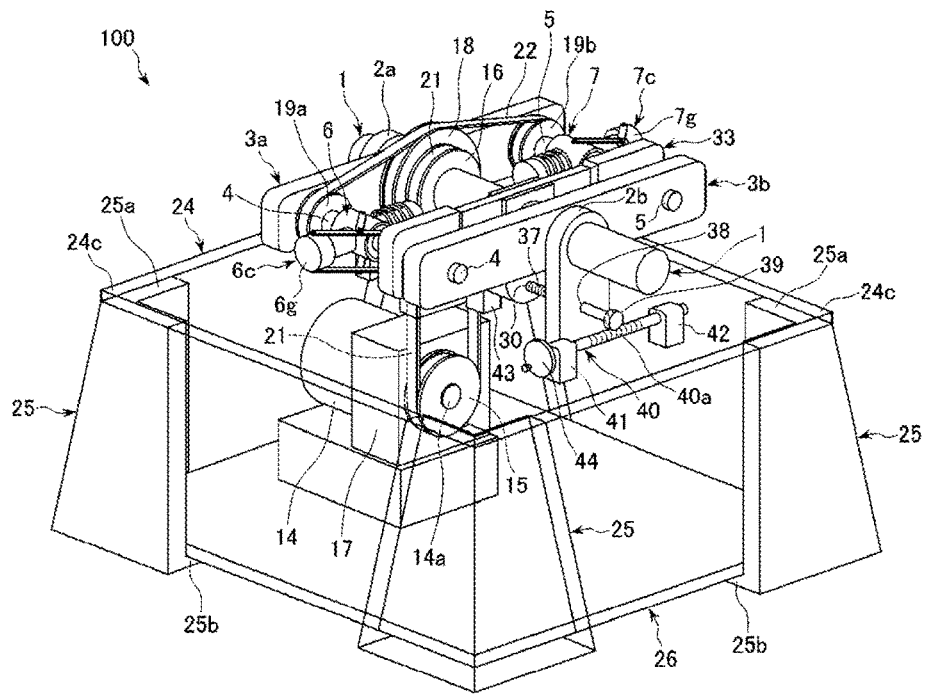
FIG. 1 is a partially omitted perspective view illustrating a repetitive moment generating device according to a first embodiment of the present invention.
Figure 2:
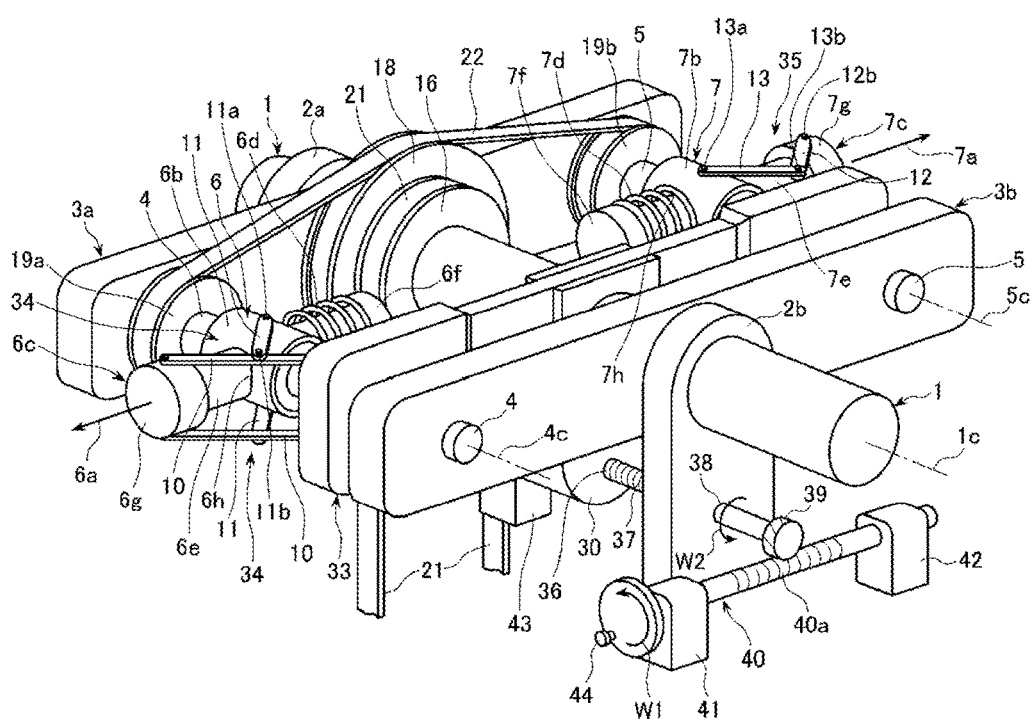
FIG. 2 is a partially enlarged view of FIG. 1.

First, the repetitive moment generating device 100 according to a first embodiment of the present invention will be described on the basis of FIGS. 1 to 3. As illustrated in FIGS. 1 and 2, the repetitive moment generating device 100 is used for a fatigue testing machine (not illustrated) for testing a fatigue strength property by imparting a repetitive moment on a test piece. The repetitive moment generating device 100 includes a principal shaft 1 that is for transmitting a repetitive moment to a test piece (not illustrated) set in the fatigue testing machine, principal bearing members 2a, 2b that are provided to stand on an upper surface of a table 24 at a predetermined distance therebetween to rotatably hold the principal shaft 1, a pair of lever members 3a, 3b that are attached to the principal shaft 1 at positions that are separated from each other in a direction of a shaft center 1c of the principal shaft 1 in a state where each of the lever members 3a, 3b is orthogonal to the principal shaft 1, shaft bodies 4, 5 that are rotatably provided around shaft centers 4c, 5c (see FIG. 2), each of which is parallel with the principal shaft 1, at positions that are symmetrical with the principal shaft 1 interposed therebetween in a region where the lever members 3a, 3b face each other, eccentric weight rotors 6, 7 that rotate along with the shaft bodies 4, 5 around the shaft centers 4c, 5c, and the like.

As illustrated in FIG. 2, the eccentric weight rotors 6, 7 include diameter expanded portions 6b, 7b provided at parts of the shaft bodies 4, 5, respectively, and eccentric weight members 6c, 7c that are inserted into through-holes 6h, 7h provided to open in the diameter expanded portions 6b, 7b in a direction that is orthogonal to the shaft centers 4c, 5c in a state where the eccentric weight members 6c, 7c are orthogonal to the shaft bodies 4, 5 and in a state where the eccentric weight members 6c, 7c are slidable in a direction that is orthogonal to the shaft bodies 4, 5. Also, a motor 14 that is drive means for causing the shaft bodies 4, 5 to synchronously rotate is included.

The eccentric weight members 6c, 7c include columnar main body portions 6e, 7e and stoppers 6f, 6g, 7f, 7g provided at both end portions of the main body portions 6e, 7e, respectively, in short columnar shapes with diameters expanded as compared with the inner diameters of the through-holes 6h, 7h. The main body portions 6e, 7e are slidable in a state where the outer circumferential surfaces thereof are in contact with the inner circumferential surfaces of the through-holes 6h, 7h, and the sliding distances of the eccentric weight members 6c, 7c with respect to the shaft bodies 4, 5 are limited to the lengths of the main body portions 6e, 7e by the stoppers 6f, 6g (7f, 7g), respectively.

Springs 6d, 7d which are elastic members are disposed in the surroundings of parts located between the stoppers 6f, 7f on one side and the diameter expanded portions 6b, 7b of the shaft bodies 4, 5 in the main body portions 6e, 7e of the eccentric weight members 6c, 7c, and both end portions of the spring 6d (7d) are locked by the diameter expanded portion 6b (7b) and the stopper 6f (7f), respectively. In a state where an external force in the longitudinal direction is not applied to the eccentric weight members 6c, 7c, the spring 6d (7d) couples the stopper 6f (7f) to the diameter expanded portion 6b (7b) of the shaft body 4 (5) to hold a state where the center of gravity of the eccentric weight member 6c (7c) is located at the shaft center 4c (5c) of the shaft body 4 (5), respectively.

Figure 3:
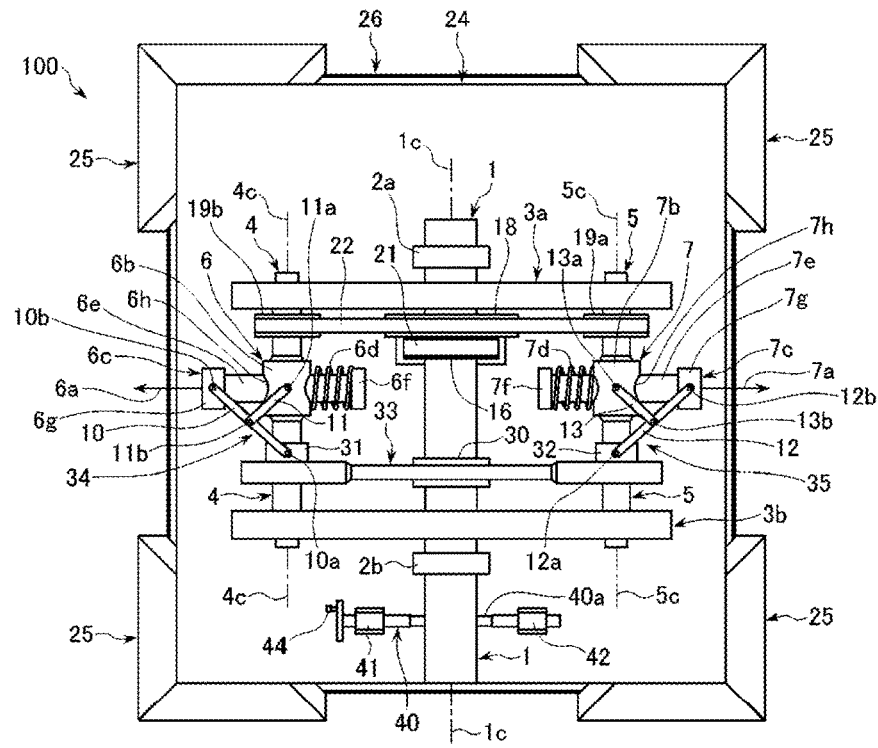
FIG. 3 is a partially omitted plan view of the repetitive moment generating device illustrated in FIG. 1.

As illustrated in FIG. 3, a slider 30 is attached to an outer circumference of a part of the principal shaft 1 between the lever members 3a, 3b. The slider 30 is slidable in the direction of the shaft center 1c of the principal shaft 1, and the principal shaft 1 can idle with respect to the slider 30. Also, a slider 31 (32) is attached to an outer circumference of a part of the shaft body 4 (5) between an eccentric rotor 6 (7) and the lever member 3b. The slider 31 (32) is slidable in the direction of the shaft center 4c (5c) of the shaft body 4 (5), and the shaft body 4 (5) can idle with respect to the slider 31 (32).

On the other hand, an interlocking member 33 that integrally couples the sliders 30, 31, 32 is provided to synchronize movement of the sliders 30, 31, 32 in the longitudinal direction of the shaft centers 1c, 4c, 5c. The interlocking member 33 is disposed at a part between the eccentric weight rotors 6, 7 and the lever member 3b such that the interlocking member 33 is orthogonal to the principal shaft 1 and the shaft bodies 4, 5 and is parallel with the lever members 3a, 3b.

A link mechanism 34 (35) is provided as joining means for converting sliding motion occurring when the slider 31 (32) slides in the direction of the shaft center 4c (5c) of the shaft body 4 (5) by causing the interlocking member 33 to move in the direction of the shaft center 1c using operation means, which will be described later, into sliding motion of the eccentric weight member 6c (7c) in a direction that is orthogonal to the shaft center 4c (5c) of the shaft body 4 (5) and transmitting the sliding motion to the eccentric weight member 6c (7c).

The link mechanism 34 (35) includes a first link member 10 (12) and a second link member 11 (13). The first link member 10 (12) is turnably and axially supported by a support shaft 10a (12a) of the slider 31 (32) on one end portion side and is turnably and axially supported by a support shaft 10b (12b) of the stopper 6g (7g) of the eccentric weight member 6c (7c) on the other end portion side. The second link member 11 (13) is turnably and axially supported by a support shaft 11a (13a) of the diameter expanded portion 6b (7b) of the shaft body 4 (5) on one end portion side and is turnably and axially supported by a support shaft 11b (13b) at the center portion of the first link member 10 (12) on the other end portion side.

Although the link mechanisms 34, 35 are illustrated only on the upper surface side of the eccentric weight rotors 6, 7 in FIG. 3, the link mechanisms 34, 35 are also provided on the lower surface side of the eccentric weight rotors 6, 7 illustrated in FIG. 2 as partially displayed near the eccentric weight rotor 6 in FIG. 2. In other words, a pair of link mechanisms 34, 34 (35, 35) are disposed to be mirror symmetrical with the eccentric weight rotor 6 (7) interposed therebetween.

As illustrated in FIG. 2, a male screw member 37 is screwed into a female screw hole 36 provided to open below the slider 30 in a state where the male screw member 37 is parallel with the shaft bodies 4, 5 and the principal shaft 1, and one end portion (not illustrated) of the male screw member 37 is turnably held by a bearing member 43 disposed on the table 24 immediately below the principal shaft 1. The other end portion side of the male screw member 37 is turnably inserted into a through-hole 38 provided to open in the principal bearing member 2b, and a helical gear 39 is attached to a distal end of the male screw member 37 projecting from the through-hole 38. The male screw member 37 is turnably held by the bearing member 43 and the through-hole 38 of the principal bearing member 2b in a state where movement of the male screw member 37 in the longitudinal direction is constrained.

The helical gear 39 is attached concentrically with the male screw member 37, a rotation shaft 40 at which the worm gear 40a is formed is disposed below the helical gear 39 such that the rotation shaft 40 multi-level crosses the male screw member 37 at a right angle, and the helical gear 39 is engaged with the worm gear 40a. Both end parts of the rotation shaft 40 are turnably held by bearing members 41, 42 disposed on the table 24, respectively, and a handle 44 is attached to the end portion of the rotation shaft 40 projecting from the bearing member 41.

If the handle 44 is rotated, then the rotation shaft 40 and the worm gear 40a rotate, the rotation is transmitted to the helical gear 39, the male screw member 37 rotates with the rotation of the helical gear 39, and the slider 30 with the female screw hole 36 into which the male screw member 37 is screwed and the interlocking member 33 move in the longitudinal direction of the male screw member 37 (the direction of the shaft center 1c of the principal shaft 1). In response to this, the sliders 31, 32 integrated with the interlocking member 33 move in the directions of the shaft centers 4c, 5c of the shaft bodies 4, 5, and the link mechanisms 34, 35 operate.

If the handle 44 is rotated in the direction of the arrow W1 as illustrated in FIG. 2, for example, then the male screw member 37 rotates in the direction of the arrow W2 via the worm gear 40a and the helical gear 39, and the slider 30 and the interlocking member 33 move in a direction separated from the lever member 3b through screwing between the male screw member 37 and the female screw hole 36.

In this manner, the sliders 31, 32 integrated with the interlocking member 33 also slide in the direction separated from the lever member 3b, the sliding motion is thus transmitted to the stoppers 6g, 7g of the eccentric weight members 6c, 7c via the link mechanisms 34, 35, the stoppers 6g, 7g move in directions separated from the diameter expanded portions 6b, 7b of the eccentric weight rotors 6, 7, respectively, and the centers of gravity of the eccentric weight members 6c, 7c are separated from the shaft centers 4c, 5c of the shaft bodies 4, 5, respectively.

On the other hand, if the handle 44 is rotated in the direction opposite to the arrow W1 after the operation of rotating the handle 44 in the direction of the arrow W1 is performed as described above, then the male screw member 37 rotates in the direction opposite to the arrow W2 via the worm gear 40a and the helical gear 39, the slider 30 and the interlocking member 33 move in the directions approaching the lever member 3*b* through the screwing between the male screw member 37 and the female screw hole 36, the stoppers 6*g*, 7*g* thus move in directions approaching the diameter expanded portions 6*b*, 7*b* of the eccentric weight rotors 6, 7, respectively, in a manner opposite to that described above, and the centers of gravity of the eccentric weight members 6*c*, 7*c* approach the shaft centers 4*c*, 5*c* of the shaft bodies 4, 5, respectively.

As illustrated in FIG. 3, the springs 6*d*, 7*d* disposed between the stoppers 6*f*, 7*f* of the eccentric weight members 6*c*, 7*c* on one side and the diameter expanded portions 6*b*, 7*b* of the shaft bodies 4, 5 couple the stoppers 6*f*, 7*f* to the shaft bodies 4, 5 to hold a state where the centers of gravity of the eccentric weight members 6*c*, 7*c* are located at the shaft centers 4*c*, 5*c* of the shaft bodies 4, 5. In this manner, since a biasing force (a force to return the centers of gravity of the eccentric weight members 6*c*, 7*c* to the positions of the shaft centers 4*c*, 5*c* of the shaft bodies 4, 5, respectively) of the springs 6*d*, 7*d* is continuously applied to the eccentric weight members 6*c*, 7*c* when the eccentric weight members 6*c*, 7*c* are moved via the link mechanisms 34, 35, it is possible to eliminate a discontinuous change in torsional moment (an influence of backlash).

Also, in a case where the link mechanisms 34, 35 are damaged during rotation of the eccentric weight rotors 6, 7 and it is not possible to hold the eccentric weight members 6*c*, 7*c* in a predetermined state, a state where the centers of gravity of the eccentric weight members 6*c*, 7*c* are located at the shaft centers 4*c*, 5*c* of the shaft bodies 4, 5 (zero eccentricity state) is recovered due to an elastic restoring force of the springs 6*d*, 7*d*, respectively, and a so-called fail-safe function is thus exhibited.

As illustrated in FIG. 1, the table 24 is a quadrangular flat plate-shaped member and is kept in a horizontal state by four support members 25 disposed on the lower surface side of four corner portions 24*c* thereof. The support members 25 have L-shaped horizontal sections and include bottom plates 25*b* provided on the lower surface side. The four corner portions 24*c* of the table 24 are fixed in a state where the corner portions 24*c* are placed on the upper surfaces 25*a* of the four support members 25, and a quadrangular flat plate-shaped bottom table 26 is disposed on the bottom plates 25*b* located at the four positions.

The motor 14, middle timing pulleys 15, 16, a large timing pulley 18, small timing pulleys 19*a*, 19*b*, and timing belts 21, 22 are included as drive means for synchronously rotating the two eccentric weight rotors 6, 7. If the motor 14 is activated, then the rotation force thereof is output to a rotation shaft 14*a* via a gear box 17.

The middle timing pulley 15 is attached to the rotation shaft 14*a* that is rotated by the motor 14, and the middle timing pulley 16 and the large timing pulley 18 are rotatably attached to the principal shaft 1 via a bearing. The rotation shaft 14*a* is parallel with the principal shaft 1, and the middle timing pulley 15 on the side of the motor 14 is located immediately below the middle timing pulley 16 on the side of the principal shaft 1 with the middle timing pulleys 15, 16 disposed to face each other in series in the up-down direction.

The small timing pulleys 19*a*, 19*b* are attached to the shaft bodies 4, 5. The small timing pulleys 19*a*, 19*b* are disposed in series with the large timing pulley 18 interposed therebetween. The sizes (outer diameters) of the small timing pulleys 19*a*, 19*b* are the same as each other, and the sizes (outer diameters) of the middle timing pulleys 15, 16 are also the same as each other.

The middle timing pulley 15 and the middle timing pulley 16 are linked with the timing belt 21, and the timing pulleys 19*a*, 19*b* and the large timing pulley 18 are linked with the timing belt 22.

If the motor 14 is activated, the middle timing pulley 15 attached integrally to the rotation shaft 14*a* rotates, the rotation of the middle timing pulley 15 is transmitted to the middle timing pulley 16 via the timing belt 21, and the middle timing pulley 16 thus rotates in the same direction as that of the rotation shaft 14*a* the same number of times of rotation. The rotation of the middle timing pulley 16 is transmitted to the large timing pulley 18 integrated with the middle timing pulley 15 via the principal shaft 1.

Since the rotation of the large timing pulley 18 is transmitted to the small timing pulleys 19*a*, 19*b* via the timing belt 22, the shaft bodies 4, 5 with the small timing pulleys 19*a*, 19*b* attached thereto rotate in mutually the same direction the same number of times of rotation. Therefore, the two eccentric weight rotors 6, 7 mutually synchronously rotate in the same direction the same number of times of rotation. Additionally, although the link mechanisms 34, 35 and the sliders 31, 32 also integrally rotate with the rotation of the two eccentric weight rotors 6, 7, the slider 30 and the interlocking member 33 are held in a stationary state. Note that in the repetitive moment generating device 100, the rotation center lines of the two eccentric weight rotors 6, 7 are the same as the shaft centers 4*c*, 5*c* of the shaft bodies 4, 5, respectively.

In the repetitive moment generating device 100 illustrated in FIGS. 1 to 3, the two eccentric weight rotors 6, 7 are disposed such that eccentricity directions (the directions of the centrifugal forces 6*a*, 7*a*) of the centers of gravity of the eccentric weight members 6*c*, 7*c* are different from each other by 180 degrees around the shaft centers 4*c*, 5*c* of the shaft bodies 4, 5, respectively. Therefore, the two eccentric weight rotors 6, 7 rotate while maintaining the relationship in which the direction of the centrifugal forces 6*a*, 7*a* are different from each other by 180 degrees around the rotation center lines (shaft centers 4*c*, 5*c*), respectively.

If the eccentric weight rotors 6, 7 rotate with rotation of the shaft bodies 4, 5 that is rotated by a drive force of the motor 14 as will be described later in a state where the centers of gravity of the eccentric weight members 6*c*, 7*c* are eccentric from the shaft centers 4*c*, 5*c*, then the eccentric weight members 6*c*, 7*c* also rotate about the shaft centers 4*c*, 5*c*, and the centrifugal forces 6*a*, 7*a* of the magnitudes determined by the amounts of eccentricity of the centers of gravity of the eccentric weight members 6, 7 and the number of times of rotation are generated in the shaft center directions of the main body portions 6*e*, 7*e*. Since the directions in which the centrifugal forces 6*a*, 7*a* act rotate about the shaft centers 4*c*, 5*c*, the directions of the centrifugal forces 6*a*, 7*a* change in the up-down and left-right directions with the rotation.

In this manner, oscillation is generated by the two eccentric weight rotors 6, 7 rotating about the rotation center lines (shaft centers 4*c*, 5*c*), respectively, the oscillation causes both end parts of the lever members 3*a*, 3*b* to alternately vibrate in the up-down direction via the shaft bodies 4, 5, the lever members 3*a*, 3*b* thus repeat minute seesaw motion around the shaft center 1*c* of the principal shaft 1, and this causes minute forward/reverse rotation of the principal shaft 1 integrated with the lever members 3*a*, 3*b*. Therefore, it is possible to impart a repetitive load (repetitive moment) on a test piece (not illustrated) by setting the test piece on an extension of the shaft center 1*c* of the principal shaft 1.

As described above, if the handle 44 is rotated in the direction of the arrow W1, then the sliders 30, 31, 32 slide in the direction separated from the lever member 3b, the stoppers 6g, 7g move in the directions separated from the diameter expanded portions 6b, 7b of the eccentric weight rotors 6, 7 via the link mechanisms 34, 35, the centers of gravity of the eccentric weight members 6c, 7c are separated from the shaft centers 4c, 5c of the shaft bodies 4, 5, respectively, the oscillation generated through the rotation of the eccentric weight rotors 6, 7 thus increases, and the amplitude of the repetitive moment imparted on the principal shaft 1 via the lever members 3a, 3b increases.

On the other hand, if the handle 44 is rotated in the direction opposite to the arrow W1 after the operation of rotating the handle 44 in the direction of the arrow W1 is performed as described above, then the male screw member 37 rotates in the direction opposite to the arrow W2 via the worm gear 40a and the helical gear 39, the sliders 30, 31, 32 move in the directions approaching the lever member 3b, the stoppers 6g, 7g move in the directions approaching the diameter expanded portions 6b, 7b of the eccentric weight rotors 6, 7, respectively, in a manner opposite to that described above, the centers of gravity of the eccentric weight members 6c, 7c approach the shaft centers 4c, 5c of the shaft bodies 4, 5, respectively, the oscillation generated through the rotation of the eccentric weight rotors 6, 7 thus decreases, and the amplitude of the repetitive moment imparted on the principal shaft 1 via the lever members 3a, 3b decreases.

In this manner, it is possible to increase or decrease the amplitude of the repetitive moment imparted on the principal shaft 1 via the lever members 3a, 3b (adjust the amplitude) by performing the operation of rotating the handle 44 in the direction of the arrow W1 or the opposite direction. Such an amplitude adjustment work can be performed not only when the two eccentric weight rotors 6, 7 are stopped but also when the two eccentric weight rotors 6, 7 are rotating.

Moreover, it is possible to set an optimal amplitude by setting the centers of gravity of the eccentric weight members 6c, 7c of the two eccentric weight rotors 6, 7 at the positions of the rotation center lines (shaft centers 4c, 5c) (zero amplitude positions) when the motor 14 is stopped, then starting the motor 14, and operating the handle 44 during rotation of the two eccentric weight rotors 6, 7 to gradually increase the amplitude, and it is thus possible to avoid so-called overshoot.

Furthermore, if a torsional moment meter and a rotation angle encoder are used together with the repetitive moment generating device 100, it is also possible to perform closed loop control, to perform testing based not only on torsional moment control but also on angular displacement control and program control, and thereby to include a variety of control functions that are comparable to an advanced hydraulic fatigue testing machine at low cost.

Note that although the repetitive moment generating device 100 illustrated in FIGS. 1 to 3 includes the two shaft bodies 4, 5, the two eccentric weight rotors 6, 7, the two sliders 31, 32, and the two link mechanisms 34, 35 for the one principal shaft 1, and each component is provided with the amplitude adjustment mechanism, the present invention is not limited thereto, and it is thus possible to employ a repetitive moment generating device 100 including one shaft body 4 (or 5), one eccentric weight rotor 6 (or 7), one slider 31 (or 32), and one link mechanism 34 (or 35) for the one principal shaft 1 and to obtain the amplitude adjustment function that is similar to that described above in this case as well.

Next, a repetitive moment generating device 200 according to a second embodiment of the present invention will be described on the basis of FIG. 4. Note that parts (members) that are common to those in the repetitive moment generating device 100 illustrated in FIGS. 1 to 3 from among parts (members) constituting the repetitive moment generating device 200 illustrated in FIG. 4 are denoted with the same reference signs as the reference signs in FIGS. 1 to 3, and description thereof will be omitted.

Figure 4:
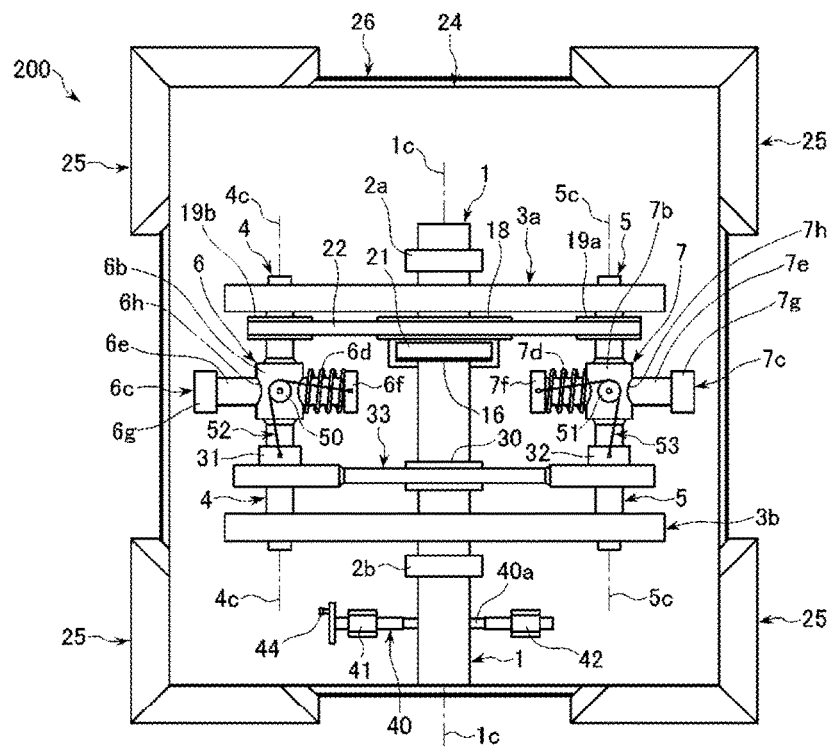
FIG. 4 is a partially omitted plan view illustrating a repetitive moment generating device according to a second embodiment of the present invention.

As illustrated in FIG. 4, the repetitive moment generating device 200 is provided with pulleys 50, 51 and wires 52, 53 instead of the link mechanisms 34, 35 illustrated in FIG. 3 as the joining means for converting the sliding motion of the sliders 31, 32 in the directions of the shaft centers 4c, 5c of the shaft bodies 4, 5 into the sliding motion of the eccentric weight members 6c, 7c in the direction that intersects the shaft bodies 4, 5 and transmitting the sliding motion to the eccentric weight members 6c, 7c. Note that the present invention is not limited to the wires 52, 53, and it is thus also possible to use flexible wire rods, string-like materials, chains, or the like as long as it has a similar function.

As illustrated in FIG. 4, the pulleys 50, 51 are turnably and axially supported by the diameter expanded portions 6b, 7b of the eccentric weight rotors 6, 7, respectively, and the slider 31 (32) and the eccentric weight member 6c (7c) are coupled with the wire 52 (53) via the pulley 50 (51). One end portion of the wire 52 (53) is locked by the slider 31 (32), and the other end portion of the wire 52 (53) is locked by the stopper 6f (7f) of the eccentric weight member 6c (7c).

If the handle 44 is rotated in the direction opposite to the arrow W1 illustrated in FIG. 2, then the sliders 31, 32 move along with the interlocking member 33 in the direction approaching the lever member 3b, the stopper 6f (7f) of the eccentric weight member 6c (7c) thus slides in the direction approaching the diameter expanded portion 6b (7b) via the wire 52 (53) and the pulley 50 (51), the center of gravity of the eccentric weight member 6c (7c) is separated from the shaft center 4c (5c) of the shaft body 4 (5), the oscillation generated through rotation of the eccentric weight rotors 6, 7 thus increases, and the amplitude of the repetitive moment imparted on the principal shaft 1 via the lever members 3a, 3b increases.

On the other hand, if the handle 44 is rotated in the direction of the arrow W1 after the operation of rotating the handle 44 in the direction opposite to the arrow W1 is performed as described above, then the sliders 30, 31, 32 move in the directions separated from the lever member 3b, the stoppers 6g, 7g move in the directions approaching the diameter expanded portions 6b, 7b of the eccentric weight rotors 6, 7, respectively, in a manner opposite to that described above, the centers of gravity of the eccentric weight members 6c, 7c approach the shaft centers 4c, 5c of the shaft bodies 4, 5, respectively due to an elastic restoring force of the springs 6d, 7d, the oscillation generated through rotation of the eccentric weight rotors 6, 7 thus decreases, and the amplitude of the repetitive moment imparted on the principal shaft 1 via the lever members 3a, 3b decreases.

In this manner, the repetitive moment generating device 200 can also adjust the amplitude of the repetitive moment imparted on the principal shaft 1 by performing the operation of rotating the handle 44 regardless of whether or not the eccentric weight rotors 6, 7 are rotating. Structures, functions, effects, advantages, and the like of the other parts are similar to those of the repetitive moment generating device 100 described above.

Note that the repetitive moment generating devices 100, 200 described on the basis of FIGS. 1 to 4 illustrate examples of the repetitive moment generating device according to the present invention, and the repetitive moment generating device according to the present invention is not limited to the aforementioned repetitive moment generating devices 100, 200.

INDUSTRIAL APPLICABILITY

The repetitive moment generating device according to the present invention can be widely used in a fatigue testing machine or the like for testing a fatigue strength property of a test piece by imparting a repetitive moment on the test piece.

REFERENCE SIGNS LIST

1 Principal shaft
2*a*, 2*b* Principal bearing member
3*a*, 3*b* Lever member
4, 5 Shaft body
1*c*, 4*c*, 5*c* Shaft center
6, 7 Eccentric weight rotor
6*a*, 7*a* Centrifugal force
6*b*, 7*b* Diameter expanded portion
6*c*, 7*c* Eccentric weight member
6*d*, 7*d* Spring
6*e*, 7*e* Main body portion
6*f*, 6*g*, 7*f*, 7*g* Stopper
6*h*, 7*h*, 38 Through-hole
14 Motor
14*a* Rotation shaft
15, 16 Middle timing pulley
17 Gear box
18 Large timing pulley
19*a*, 19*b* Small timing pulley
21, 22 Timing belt
24 Table
24*a* Upper surface
24*b* Lower surface
24*c* Corner portion
25 Support member
25*a* Upper surface
25*b* Bottom plate
26 Bottom table
30, 31, 32 Slider
33 Interlocking member
34, 35 Link mechanism
36 Female screw hole
37 Male screw member
39 Helical gear
40 Rotation shaft
40*a* Worm gear
41, 42, 43 Bearing member
44 Handle
50, 51 Pulley
52, 53 Wire
100, 200 Repetitive moment generating device

The invention claimed is:

1. A repetitive moment generating device that is used for a fatigue testing machine for testing a fatigue strength property by imparting a repetitive moment on a test piece, the repetitive moment generating device comprising:

a principal shaft that is rotatably held to transmit a repetitive moment to a test piece set in the fatigue testing machine;

a pair of lever members that are attached to the principal shaft at positions that are separated from each other in a shaft center direction of the principal shaft in a state where each of the lever members is orthogonal to the principal shaft; and shaft bodies that are rotatably held around shaft centers, each of which is parallel with the principal shaft, at positions that are symmetrical with the principal shaft interposed therebetween in a region where the lever members face each other;

drive means for causing the shaft bodies to synchronously rotate;

eccentric weight members that are attached to the shaft bodies in a state where the eccentric weight members intersect the shaft bodies and in a state where the eccentric weight members are slidable in a direction that intersects the shaft bodies;

sliders that are attached to the shaft bodies in a state where the sliders are slidable in shaft center directions of the shaft bodies and in a state where the shaft bodies are able to idle;

joining means for converting sliding motion of the sliders in the shaft center directions of the shaft bodies into sliding motion of the eccentric weight members in a direction that intersects the shaft bodies and transmitting the sliding motion to the eccentric weight members; and operation means for causing the sliders to slide in the shaft center directions of the shaft bodies.

2. The repetitive moment generating device according to claim 1,
wherein the joining means includes link mechanisms that include
first link members that are turnably and axially supported by the sliders on one end portion side and are turnably and axially supported by the eccentric weight members on the other end portion side, and
second link members that are turnably and axially supported by the shaft bodies on one end portion side and are turnably and axially supported by the first link members on the other end portion side.

3. The repetitive moment generating device according to claim 1, wherein the joining means includes wires that couple the sliders to the eccentric weight members via pulleys that are turnably and axially supported by the shaft bodies.

4. The repetitive moment generating device according to claim 1, wherein the eccentric weight members are provided with stoppers that limit a sliding distance of the eccentric weight members with respect to the shaft bodies to a predetermined range.

5. The repetitive moment generating device according to claim 4, wherein between the stoppers of the eccentric weight members on one side and the shaft bodies, elastic members that couple the stoppers to the shaft bodies are disposed to hold a state where centers of gravity of the eccentric weight members are located at shaft centers of the shaft bodies.

6. The repetitive moment generating device according to claim 1,
wherein the operation means includes
a male screw member that is screwed into a female screw hole provided to open in the sliders in a state where the male screw member is parallel with the shaft bodies, a bearing member that turnably holds the male screw member in a state where movement of the male screw member in a longitudinal direction is constrained, and a turning mechanism that causes the male screw member to turn.

7. The repetitive moment generating device according to claim 6, wherein the turning mechanism includes a helical gear that is attached to the male screw member concentrically with the male screw member, a worm gear that is engaged with the helical gear, and a handle that causes the worm gear to turn.

\* \* \* \* \*